(No Model.)

J. LAFEBER.
COMBINED STALK CUTTER AND SOIL PULVERIZER.

No. 275,501. Patented Apr. 10, 1883.

WITNESSES:
Frank A. Jacob.
H. P. Hood.

INVENTOR:
James Lafeber

UNITED STATES PATENT OFFICE.

JAMES LAFEBER, OF INDIANAPOLIS, INDIANA.

COMBINED STALK-CUTTER AND SOIL-PULVERIZER.

SPECIFICATION forming part of Letters Patent No. 275,501, dated April 10, 1883.

Application filed November 24, 1882. (No model.)

*To all whom it may concern:*

Be it known that I, JAMES LAFEBER, of the city of Indianapolis, in the county of Marion and State of Indiana, have invented certain new and useful Improvements in a Combined Stalk-Cutter and Soil-Pulverizer, of which the following is a specification, having reference to the accompanying drawings.

My invention relates to an improvement on a soil-pulverizer for which Letters Patent were granted to me dated January 27, 1880, numbered 223,927.

The object of my present invention is to better adapt the machine to cut and bury cornstalks, to more thoroughly pulverize the soil, and to keep the crushing-roller free from adhering soil.

My invention consists, first, in the construction of the stalk-cutting wheels and means for adjusting the same, so that when arranged in a series on a shaft they will present nearly continuous cutting-edges when used for stalk-cutting, or operate as cleaners to keep the crushing-roll clear when used as a soil-pulverizer; second, in an additional series of star-shaped wheels mounted on a shaft, and so combined with the before-mentioned series of stalk-cutters as to more perfectly pulverize the soil and bury the stalks when cut, and to act as cleaners to the stalk-cutting series when the machine is used as a pulverizer alone.

Figure 1:
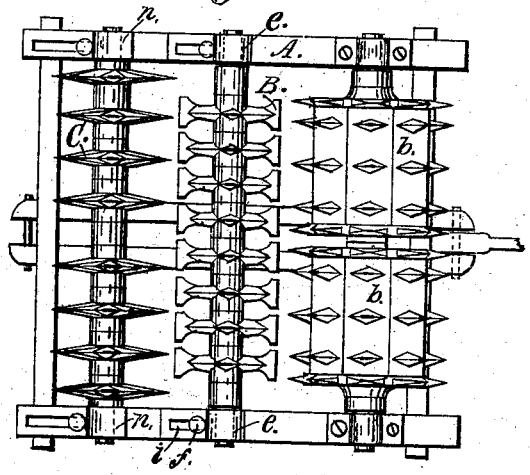
Figure 2:
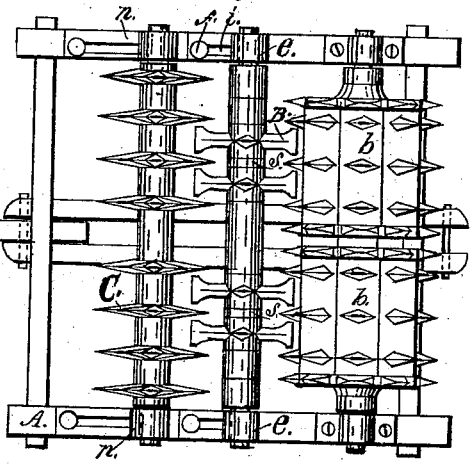
Figure 3:
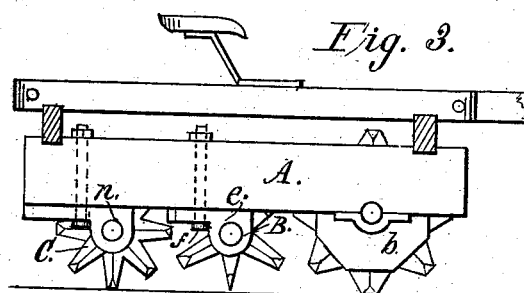
Figure 4:
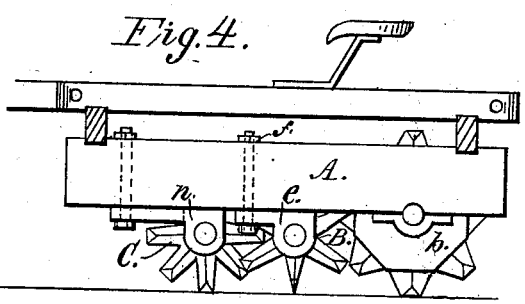
Figure 5:
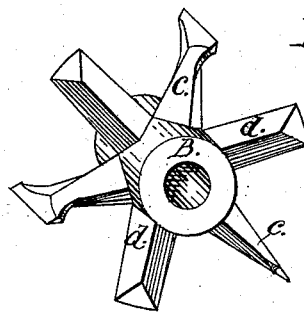

The accompanying drawings illustrate my invention. Figure 1 represents an inverted plan of my machine when arranged for use as a combined stalk-cutter and pulverizer. Fig. 2 represents a similar plan when arranged for use as a pulverizer alone. Fig. 3 is a side elevation when arranged as in Fig. 1. Fig. 4 is a side elevation when arranged as in Fig. 2. Fig. 5 is an enlarged perspective view of one of the stalk-cutting wheels.

Like letters indicate the same parts in all figures.

A is a rectangular frame, of wood, to which the mechanism is attached. Frame A is adapted to receive a draft-pole at either side, so that it may be drawn either way, is provided with a reversible seat, and has secured in bearings on its under side a shaft carrying a pair of octagonal rollers, $b$ $b$, which are studded with short wedge-shaped teeth, all being in these particulars the same as fully shown and described in my former patent before referred to, with the exception that the teeth in rollers $b$ form in this case continuous rows around the roller, instead of setting alternately, as in the former case. At one side of rollers $b$ is placed, on a shaft, a series of rimless wheels, B, each consisting of a central hub having at equal distances radial arms $c$ $d$, Fig. 5. Arms $c$ terminate in broad cutting-edges placed parallel to the axis of the wheel, and therefore at a right angle to the line of draft. The length of said cutting-edges is about one-fourth of an inch less than the length of the hub, so that when a series of such wheels are placed on a shaft with the ends of their hubs in contact, and the arms $c$ placed in line, a very nearly continuous cutting-edge is formed, as shown in Fig. 1. Arms $d$ also terminate in cutting-edges, but placed at a right angle with those of arms $c$ and parallel with the line of movement. The object of this construction is to insure the cutting of all stalks and trash lying on the ground whether parallel with or across the line of movement. A series of wheels, B, are slipped loosely on a shaft which is mounted in bearings $e$, adjustably secured by means of bolts $f$, passing through slots $i$, to frame A. The object of having said bearings adjustably secured to the frame is to permit the placing of wheels B nearer to rollers $b$, for a purpose hereinafter explained. A series of star-shaped wheels, C, of well known form, having their radial arms terminating in wedge-shaped points, whose edges are parallel with the line of movement, are slipped loosely on a shaft mounted in bearings $n$, also adjustably secured to frame A, the purpose of said adjustment being to place wheels C nearer to or farther from wheels B.

The operation of my machine as a combined stalk-cutter and pulverizer is as follows: All the parts being arranged as shown in Figs. 1 and 3, the machine is drawn forward, the rollers $b$ being in front. The standing stalks are crushed down by the rollers and are cut and partially buried by the wheels B, the cutting-edges of which, being alternately parallel with and across the line of movement, allow none of the stalks to escape cutting. After passing wheels B the stalks are caught and still further forced into the now softened and broken earth by wheels C, which still further divide all remaining clods of earth and thoroughly mix stalks and earth together, so that the stalks will readily decay. When the machine is to be used as soil-pulverizer alone, wheels B are removed from their shaft, and a portion of them are replaced on the shaft, with short sleeves or washers S, Fig. 2, between them, the length of said sleeves being sufficient to allow the teeth of rollers $b$ to pass between the broad cutting ends of arms $c\,d$. When it is desired to use the machine as a cultivator, a longer sleeve may be used in the center of the series. When a sufficient number of wheels and sleeves have been placed on the shaft to fill its length, it is replaced in its bearings, and said bearings are moved up nearer to the rollers and there secured, so that the ends of the radial arms $c$ and $d$ will nearly touch the surface of the roller. Bearings $n$ are now moved nearer to bearings $e$ and there secured, so that the ends of the radial arms on wheels C will nearly touch the hubs of wheels B. The draft-pole is now transferred to the other side of frame A and the machine drawn forward, the wheels C being in front. The clods are first divided in the direction of the line of movement, then across at right angles thereto by arms $c$ of wheels B, and are still further divided and rolled smooth by rollers $b$. The intersecting of the paths of rotary movement of the arms of wheels C and B causes each to keep the other free from adhering clods and trash, and the broad ends of arms $c$ in wheels B scrape off any trash or accumulations of soil on rollers $b$.

I claim as my invention—

1. In a stalk-cutting and soil-pulverizing machine, the combination, with frame A and rollers $b$, of a series of wheels having radial arms terminating in broad cutting-edges parallel with the axis of said wheels, and forming a series of nearly continuous cutting-edges across the line of movement of the machine, alternating with radial arms terminating in cutting-edges parallel with the line of movement, substantially as described, and for the purpose set forth.

2. The combination, with frame A and rollers $b$, of wheels B, placed on a shaft with sleeves S, as described, and mounted in adjustable bearings $e$, for the purpose set forth.

JAMES LAFEBER.

Witnesses:
FRANK A. JACOB,
H. P. HOOD.